(12) United States Patent  
Kosaka

(10) Patent No.: US 11,212,397 B1  
(45) Date of Patent: Dec. 28, 2021

(54) IMAGE READING SYSTEM, IMAGE FORMING SYSTEM, AND IMAGE READING METHOD FOR DIVIDING EACH AREA INTO BLOCKCHAINS

(71) Applicant: KYOCERA Document Solutions Inc., Osaka (JP)

(72) Inventor: Naohiko Kosaka, Dublin, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/917,703

(22) Filed: Jun. 30, 2020

(51) Int. Cl.
*H04N 1/00* (2006.01)
*G06F 16/51* (2019.01)
*G06F 16/55* (2019.01)
*G06K 9/00* (2006.01)
(Continued)

(52) U.S. Cl.
CPC ......... *H04N 1/00214* (2013.01); *G06F 16/51* (2019.01); *G06F 16/55* (2019.01);
(Continued)

(58) Field of Classification Search
CPC .. H04N 1/00214; H04N 1/00244; H04N 1/04; H04N 1/387; H04N 1/00–00002; H04N 1/00007–00001; H04N 1/0015; H04N 1/0021; H04N 1/00026–00042; H04N 1/0005–009; H04N 1/0095–00517; H04N 1/00763–00782; H04N 1/0083–00832; H04N 1/00838–00907; H04N 1/00912–00997; H04N 1/21; H04N 1/2307–2392; H04N 1/32–32138; H04N 1/32358–36; H04N 1/42–4493; H04N 2201/0008–098; H04N 2201/21–3267; H04N 2201/3273–33371; H04N 2201/33385–33392; G06F 16/55; G06F 16/51; G06F 3/12–1298;
(Continued)

(56) References Cited

U.S. PATENT DOCUMENTS 7,340,092 B2   3/2008  Tanaka et al.
10,331,950 B1 * 6/2019  Suriyanarayanan .. G06F 40/284
(Continued)

FOREIGN PATENT DOCUMENTS

JP         2008-061170 A    3/2008

*Primary Examiner* — Negussie Worku
(74) *Attorney, Agent, or Firm* — Hawaii Patent Services; Nathaniel K. Fedde; Kenton N. Fedde

(57) ABSTRACT

Provided is an image reading system that can disperse and improve the image quality of a document. The document reading unit reads a document page by page and outputs it as image data. The area classification unit classifies the read image data into area data for each content. The blockchain creation unit creates a block in which identification information is added to the classified area data, and sequentially calculates and includes the previous hash value of the previous block, thereby creating the blockchain of the document. The image processing unit in information processing apparatus processes or deletes the area data for each received block. The block acquisition unit acquires a block processed by the information processing apparatus. The document output unit collectively reconstructs the block that is acquired into document data and outputs the document data.

15 Claims, 11 Drawing Sheets

1: IMAGE FORMING APPARATUS (IMAGE READING APPARATUS)
2: INFORMATION PROCESSING APPARATUS

(51) Int. Cl.
*H04N 1/387* (2006.01)
*H04N 1/04* (2006.01)

(52) U.S. Cl.
CPC ..... *G06K 9/00456* (2013.01); *H04N 1/00244* (2013.01); *H04N 1/04* (2013.01); *H04N 1/387* (2013.01)

(58) Field of Classification Search
CPC .. G06F 2206/15–1514; G06K 9/00456; G06K 15/00–024; G06K 15/18–1823; G06K 15/1827–1834; G06K 15/1856–1865; G06K 15/1882–1888; G06K 15/40–4095; G06K 2215/0002–0037; G06K 2215/0082–0091; G06K 2215/0097; Y02D 10/159
USPC .......................................................... 358/1.1
See application file for complete search history.

(56) References Cited

U.S. PATENT DOCUMENTS

| | | | |
|---|---|---|---|
| 10,891,208 B2* | 1/2021 | Moeller | G06K 19/07749 |
| 2011/0110610 A1 | 5/2011 | Hashiguchi | |
| 2014/0132799 A1* | 5/2014 | Kim | G06K 9/00456 348/231.2 |
| 2015/0262007 A1* | 9/2015 | Sesum | G06K 9/00463 382/177 |
| 2018/0241565 A1* | 8/2018 | Paolini-Subramanya | H04L 63/123 |
| 2018/0268504 A1* | 9/2018 | Paolini-Subramanya | G06Q 20/3823 |
| 2019/0166284 A1* | 5/2019 | Sadowara | G06K 9/00456 |
| 2021/0021407 A1* | 1/2021 | Weerasinghe | G06F 16/78 |
| 2021/0182423 A1* | 6/2021 | Padmanabhan | G06F 21/602 |

* cited by examiner

1: IMAGE FORMING APPARATUS (IMAGE READING APPARATUS)
2: INFORMATION PROCESSING APPARATUS

Lorem Ipsum

Lorem ipsum dolor sit amet, ea eum idque referrentur. Purto voluptatibus in has. Sint quodsi mei ut. Tale tincidunt id mei, menandri explicari in quo, ut est invidunt iracundia comprehensam. Indoctum ullamcorper no mel.

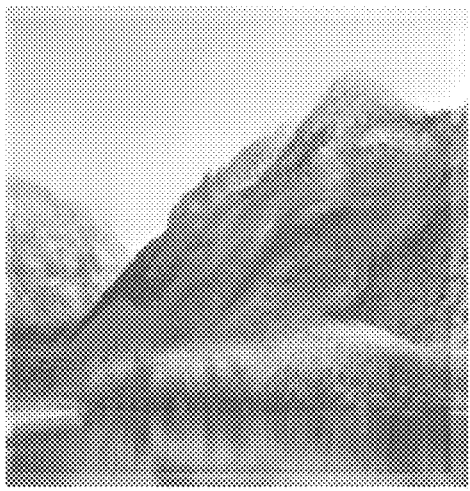

Ut nisl magna oratio vis. Brute malorum postulant quo ut, nec verear posidonium cu. Noluisse assentior cotidieque ut cum. Mel id causae tamquam, esse theophrastus per At ipsum. Ligula ut Advertisement. We provide all type of cleaning. Call 1800-111-1111.

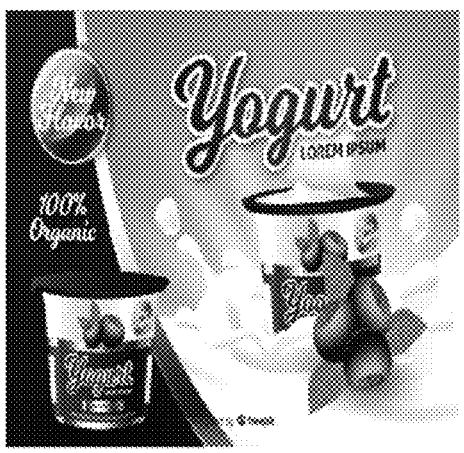

Page 1

FIG.7

IMAGE READING SYSTEM, IMAGE FORMING SYSTEM, AND IMAGE READING METHOD FOR DIVIDING EACH AREA INTO BLOCKCHAINS

BACKGROUND

The present disclosure relates to an image reading system, an image forming system, and an image reading method, and particularly to an image reading system, an image forming system, and an image reading method that divides an area into blockchains.

Typically, there is an image forming apparatus such as a multifunctional peripheral (MFP) capable of printing a document or an image. The image forming apparatus is also used as an image reading apparatus, which is mainly used for scanning. Moreover, there are also a dedicated reading apparatus such as a document scanner and a network scanner.

A typical image reading apparatus is disclosed. The typical apparatus is an image scanner system and an image scanner apparatus capable of correcting the brightness of a captured image without using an initial setting sheet. In this apparatus, a display section is provided on a mat section, a rectangular section of the display section is displayed in white, an image is taken by a camera section, and a brightness correction parameter is calculated for the obtained image by a host apparatus. The correction parameters obtained by calculation are used to correct the brightness of an image obtained by imaging the imaging target during operation.

SUMMARY

An image reading system of the present disclosure is an image reading system including an image reading apparatus and an information processing apparatus, wherein: the image reading apparatus includes: a document reading unit configured to read a document in page units and output an image data, an area classification unit configured to classify the image data read by the document reading unit into area data for each content, a blockchain creation unit configured to create a blockchain of the document by creating a block in which identification information is added to the area data classified by the area classification unit, and calculating and including a previous hash value of previous block in order, a block transmission unit configured to transmit the block created by the blockchain creation unit to the information processing apparatus, a block acquisition unit configured to acquire the block processed by the information processing apparatus, and a document output unit configured to collectively reconstruct the block acquired by the block acquisition unit into document data and output the document data; and the information processing apparatus includes: a block reception unit configured to receive the block from the image reading apparatus, an image processing unit configured to process or delete the area data for the block received by the block reception unit, and a block retransmission unit configured to retransmit the block including the area data processed by the image processing unit to the image reading apparatus or another information processing apparatus.

An image forming system according to the present disclosure is an image forming system including an image forming apparatus and an information processing apparatus, wherein the image forming apparatus includes: a document reading unit configured to read a document in page units and output an image data, an area classification unit configured to classify the image data read by the document reading unit into area data for each content, a blockchain creation unit configured to create a blockchain of the document by creating a block in which identification information is added to the area data classified by the area classification unit, and calculating and including a previous hash value of previous block in order, a block transmission unit configured to transmit the block created by the blockchain creation unit to the information processing apparatus, a block acquisition unit configured to acquire the block processed by the information processing apparatus, a document output unit configured to collectively reconstruct the block acquired by the block acquisition unit into document data and output the document data, and an image forming unit configured to form an image of the document data output by the document output unit; and the information processing apparatus includes: a block reception unit configured to receive the block from the image reading apparatus, an image processing unit configured to process or delete the area data for the block received by the block reception unit, and a block retransmission unit configured to retransmit the block including the area data processed by the image processing unit to the image reading apparatus or another information processing apparatus.

An image reading method according to the present disclosure is an image reading method executed by an image reading system having an image reading apparatus and information processing apparatus, including the steps of: in the image reading apparatus, reading a document page by page and outputting as image data; in the image reading apparatus, classifying the read image data into area data for each content; in the image reading apparatus, creating a blockchain of the document by creating a block in which identification information is added to the classified area data, and calculating and including a pre-hash value of previous block in order; in the image reading apparatus, transmitting the created block to the information processing apparatus; in the information processing apparatus, receiving the block from the image reading apparatus; in the information processing apparatus, processing or deleting the area data of received block; in the information processing apparatus, retransmitting the block including the processed area data to the image reading apparatus or another information processing apparatus; in the image reading apparatus, acquiring the block processed by the information processing apparatus; and in the image reading apparatus, collectively reconstructing the block that is acquired into document data and outputting the document data.

BRIEF DESCRIPTION OF THE DRAWINGS

FIG. 7 is a diagram showing an example of image data by the document reading process as shown in FIG. 6;

DETAILED DESCRIPTION

Embodiment

[System Configuration of Image Forming System X]

Figure 1:
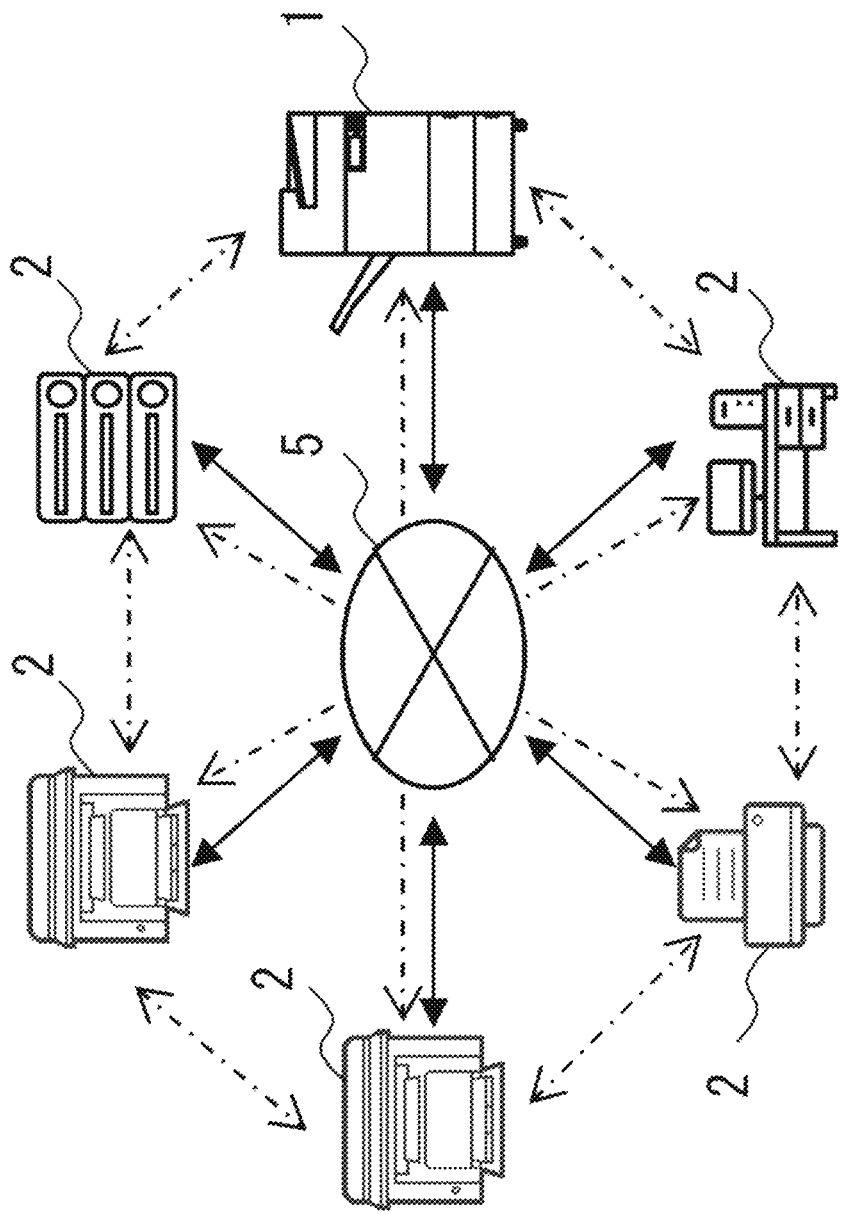
FIG. 1 is a system configuration diagram of an image forming system according to an embodiment of the present disclosure.

First, a system configuration of an image forming system X according to an embodiment of the present disclosure is described with reference to FIGS. 1 to 3.

Here, the image forming system X of the present embodiment is a distributed image reading system including the image forming apparatus 1 and a plurality of information processing apparatuses 2.

In the image forming system X of the present embodiment, each image forming apparatus 1 and the information processing apparatus 2 are connected via the network 5.

The image forming apparatus 1 is an example of the image reading apparatus of the present embodiment. The image forming apparatus 1 includes an MFP, a network scanner, a document scanner, a network FAX, a printer, or the like, which can transmit and receive various data. The image forming apparatus 1 can also read a document, copy it, scan it, send it by facsimile, send it by e-mail, print it, store it in a document box, or the like, so as to output it. In the present embodiment, the image forming apparatus 1 can output the document data 230 (FIG. 4) processed by the information processing apparatus 2.

The information processing apparatus 2 may control the image forming apparatus 1, process the read image data 200 (FIG. 4), and manage the created document data 230. The information processing apparatus 2 can send and receive various data from and to the image forming apparatus 1. In the present embodiment, the information processing apparatus 2 may be an MFP, a printer, a server, a general-purpose machine, a NAS (Network Attached Storage), a PC (Personal Computer), a mobile phone, a smartphone, or the like.

In case that the information processing apparatus 2 is a server, it executes a general-purpose OS (Operating System) such as Linux®, Windows®, or the like, and provides various services (daemons) on the OS. When the information processing apparatus 2 is a terminal such as a PC, a device driver for the image forming apparatus 1 is installed, and image processing as described below can be executed.

In addition, in the following description, an example in which a server is used as an example of the information processing apparatus 2 is described.

In this case, the information processing apparatus 2 (server) may be able to perform storing, managing, charging, or authorizing the document data 230, or the like. Further, the information processing apparatus 2 may store the document data 230 in a document box (shared folder or storage folder) associated with the user.

Further, the information processing apparatus 2 may be capable of performing transmission processing to a DMS (Document Management System), or the like, for business or office work.

The network 5 is an Intranet such as a LAN (Local Area Network), a WAN (Wide Area Network) such as the Internet or a mobile phone network, or the like. When the network 5 is a LAN, it may be a wireless LAN such as Wi-Fi®. When the network 5 is a WAN, it may be connectable to a server on a so-called "cloud" via a router, a gateway, or the like. Further, the network 5 may be connected to a plurality of networks by a VPN (Virtual Private Network), a bridge, or the like.

Figure 4:
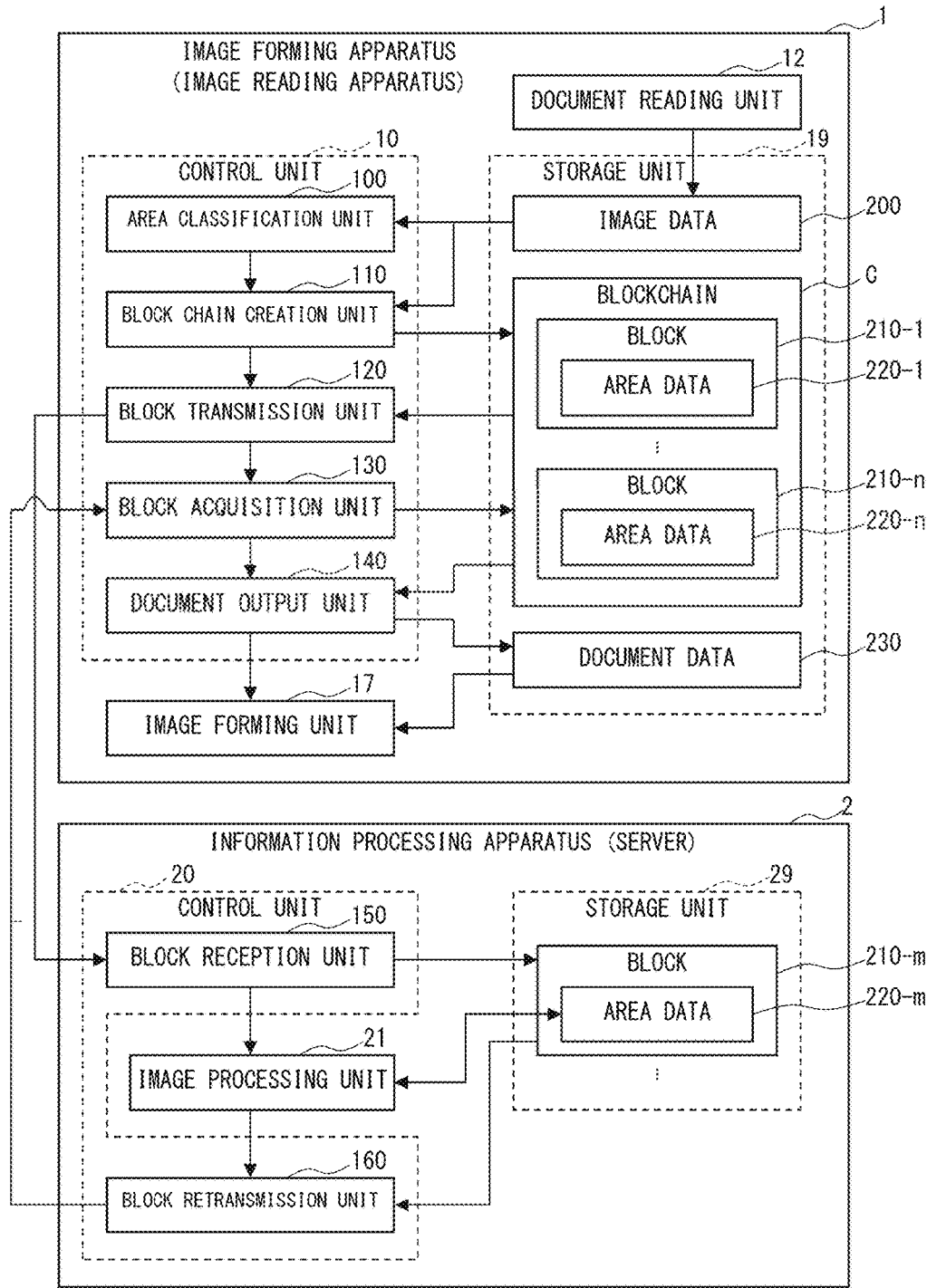
FIG. 4 is a block diagram showing a functional configuration of the image forming system according to the embodiment of the present disclosure.

Here, in the present embodiment, each image forming apparatus 1 and the information processing apparatus 2 function as a node of a P2P (Peer to Peer) network, as indicated by the chain line. Specifically, the user can read a document by the image forming apparatus 1, subject the document to high image quality processing by the information processing apparatus 2, and then convert the document data 230 (FIG. 4). However, in this embodiment, the image forming apparatus 1 and each information processing apparatus 2 do not have a relationship between a client and a server, and dispersedly store data, perform image processing, and the like.

(Control Configuration of the Image Forming Apparatus 1)

Figure 2:
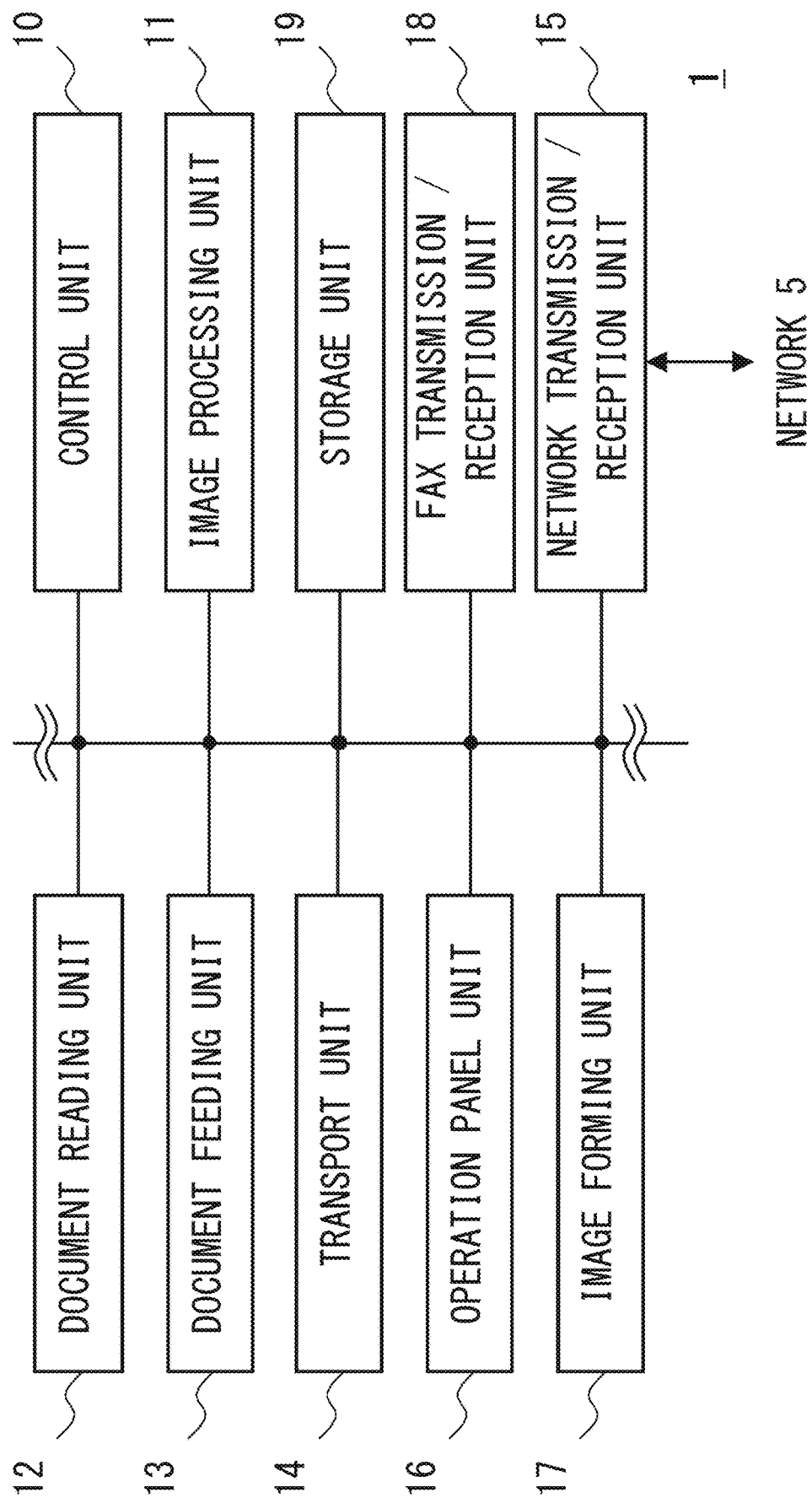
FIG. 2 is a block diagram showing a control configuration of the image forming apparatus as shown in FIG. 1.
Figure 3:
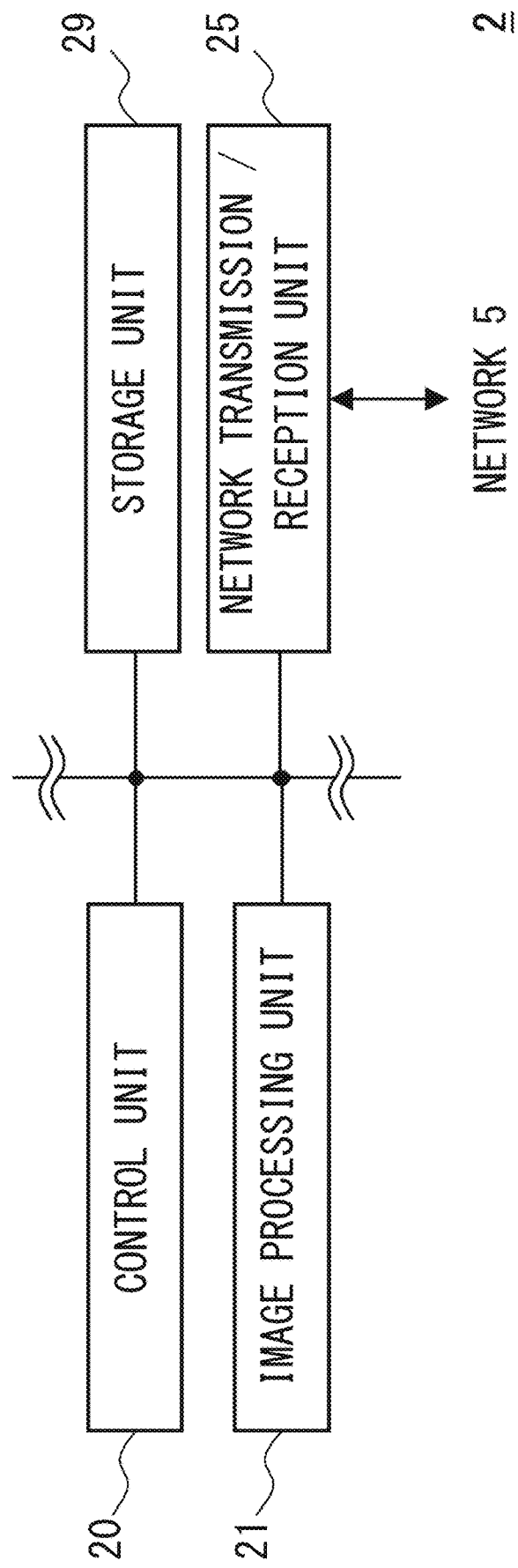
FIG. 3 is a block diagram showing a control configuration of the information processing apparatus as shown in FIG. 1.

Next, with reference to FIG. 2, a control configuration of the image forming apparatus 1 according to the embodiment of the present disclosure is described in detail.

The image forming apparatus 1 includes a control unit 10, an image processing unit 11, a document reading unit 12, a document feeding unit 13, a paper feeding unit 14, a network transmitting/receiving unit 15, an operation panel unit 16, an image forming unit 17, and a FAX transmitting/receiving unit 18, and a storage unit 19, and the like. Each unit is connected to the control unit 10 and its operation is controlled by the control unit 10.

The control unit 10 is information processing unit such as a GPP (General Purpose Processor), a CPU (Central Processing Unit, a central processing unit), an MPU (Micro Processing Unit), a DSP (Digital Signal Processor), a GPU (Graphics Processing Unit), and an ASIC (Application Specific Integrated Circuit, a processor for a specific purpose), and the like.

The control unit 10 reads a control program stored in the ROM or HDD of the storage unit 19, expands the control program in the RAM, and executes the control program to operate as each unit of the functional blocks as described later. Further, the control unit 10 controls the entire apparatus according to prescribed instruction information input from the operation panel unit 16 or an external terminal.

The image processing unit 11 is a control calculation unit such as a DSP (Digital Signal Processor), a GPU (Graphics Processing Unit), an ASIC, and the like. The image processing unit 11 performs image processing on the image data 200. This image processing may be processing such as enlargement/reduction, rotation, distortion (skew) correction, density adjustment, gradation adjustment, image improvement, and the like. The skew correction includes processing of a spread portion of a spread document such as a book. In addition, the image processing unit 11 may be capable of performing processing such as increasing the resolution of the image data 200 and removing noise.

The image processing unit 11 can also store the image data 200 read by the document reading unit 12 in the storage unit 19 and send it to the information processing apparatus 2. Further, the image processing unit 11 may also include an accelerator function for converting the electronic document data 230 and other image data.

The image processing unit 11 may also have an AI (Artificial Intelligence) accelerator function. Specifically, the image processing unit 11 may include at least a part of a learned model for performing geometric layout analysis of an image, various models included in the image processing unit 21 (FIG. 3) as described later, and the like.

The image processing unit 11 also stores the image read by the document reading unit 12 in the storage unit 19 as print data. At this time, the image processing unit 11 can also convert the print data into a file of an electronic document such as PDF or an image data such as TIFF. Further, the image processing unit 11 may be capable of performing at least a part of OCR (Optical Character Recognition) processing.

The document reading unit 12 reads the set document. Further, the document reading unit 12 is arranged above the main body of the image forming apparatus 1.

The document reading unit 12 includes a scanner, a platen glass, and a document reading slit. When reading a document placed on the platen glass, the document reading unit 12 moves the scanner to a position facing the platen glass, reads the document placed on the platen glass while scanning the document and acquires the image data 210. The acquired image data 200 is output to the control unit 10.

Further, when reading the document fed from the document feeding unit 13, the document reading unit 12 moves the scanner to a position facing the document reading slit. Then, the document reading unit 12 reads the document through the document reading slit in synchronization with the document feeding operation by the document feeding unit 13 and acquires the image data 200. The document reading unit 12 outputs the acquired image data 200 to the control unit 10.

The document feeding unit 13 conveys a document read by the document reading unit 12. The document feeding unit 13 is arranged above the document reading unit 12.

The document feeding unit 13 includes a document placing unit and a document conveying mechanism. The document feeding unit 13 sequentially feeds out the document placed on the document placing unit one by one by the document feeding mechanism and feeds it to the document reading unit 12.

The paper feeding unit 14 feeds the recording paper one by one toward the image forming unit 17. The paper feeding unit 14 is provided in the main body.

The network transmission/reception unit 15 is a network connection unit including a LAN board, a wireless transceiver, or the like, for connecting to the network 5.

The network transmission/reception unit 15 transmits/receives data via a data communication line and transmits/receives a voice signal via a voice telephone line.

The operation panel unit 16 includes an input unit such as a button, a touch panel, and the like, and a display unit such as an LCD (Liquid Crystal Display), an organic EL display, and the like. The buttons on the input unit of the operation panel unit 16 are a numeric pad, a button for issuing a start, cancel, operation mode switching, job execution instruction, and the like. Among these, the switchable operation modes include, for example, modes such as copying, FAX transmission, scanner, network scanner, or the like. Executable jobs include, for example, reading a document, printing a document, transmitting, storing, recording, or the like.

The operation panel unit 16 is arranged on the front side of the image forming apparatus 1. The input unit of the operation panel unit 16 acquires instructions of various jobs of the image forming apparatus 1 by the user. Further, it is possible to input and change the information of each user according to the user's instruction acquired from the operation panel unit 16.

The image forming unit 17 causes an image to be formed on a recording sheet from data stored in the storage unit 19, read by the document reading unit 12, or acquired from an external terminal according to a user's output instruction.

The image forming unit 17 includes a photosensitive drum, an exposure unit, a developing unit, a transfer unit, a fixing unit, and the like. The image forming unit 17 records a toner image on a recording sheet by executing an image forming process including charging, exposure, development, transfer, and fixing.

The FAX transmission/reception unit 18 transmits/receives a facsimile. The FAX transmission/reception unit 18 can receive a facsimile from another FAX apparatus via a voice line, saves it in the storage unit 19, and causes the image forming unit 17 to form an image. Further, the FAX transmission/reception unit 18 converts a document read by the document reading unit 12 or network FAX data transmitted from the external terminal into image data 200, and transmits the image data 200 to another FAX apparatus by facsimile via a voice line. Is possible.

The storage unit 19 is a non-transitory recording medium such as a semiconductor memory such as a ROM (Read Only Memory) and a RAM (RandomAccess Memory), and as an HDD (Hard Disk Drive), or the like.

The contents in the RAM of the storage unit 19 are retained by a function such as self-refresh even in the power saving state.

A control program for controlling the operation of the image forming apparatus 1 is stored in the ROM or the HDD of the storage unit 19. In addition, the storage unit 19 also stores user account settings. Further, the storage unit 19 may include a storage folder (document box) area for each user.

In addition, in the image forming apparatus 1, the control unit 10 and the image processing unit 11 may be integrally formed, such as a CPU with a built-in GPU, a chip-on-module package, an SOC (System On a Chip), and the like.

Further, the control unit 10 and the image processing unit 11 may include a RAM, a ROM, a flash memory, or the like. Furthermore, the control unit 10 can perform at least a part of the image processing of the image processing unit 11.

(Configuration of Information Processing Apparatus 2)

Next, the configuration of the information processing apparatus 2 is described with reference to FIG. 3. As described above, here, the configuration in the case that the information processing apparatus 2 is the server is described.

The information processing apparatus 2 includes a control unit 20, an image processing unit 21, a network transmission/reception unit 25, a storage unit 29, and the like.

The control unit 20 is an information processing unit such as GPP, CPU, MPU, DSP, GPU, ASIC, and the like.

The image processing unit 21 is a control operation unit such as a GPU, a DSP, an ASIC, and the like.

In the present embodiment, the image processing unit 21 can perform analysis and recognition process on an image. The image processing unit 21 can also recognize, for example, whether the image is color, partial color, or monochrome (black or white), or can acquire the ground color.

In addition, the image processing unit 21, may include an accelerator function of an AI (Artificial Intelligence) including a CNN (Convolutional Neural Network), another artificial neural network, reinforcement learning, and the like. In this case, the image processing unit 21 can use a learned model or perform model learning. In the present embodiment, it is possible to use various models for recognizing a document area and recognizing a text, a table, and an image. Among these, for the image, a model that recognizes a non-text line, a symbol, an illustration, a logo, a photograph, or the like, can be used. For a photograph, a model that recognizes an imaged object such as a person, an animal, a material body, or the like, can also be used. Furthermore, it is also possible to use a model that recognizes an advertisement by combining these various models.

In the present embodiment, the image processing unit 21 can execute an OCR (Optical Character Recognition) process. The image processing unit 21 can also perform the OCR by using various types of image recognition algorithm and AI. The image processing unit 21 can also detect the location of the form in the table by the OCR. For the location of the form, it is possible to use the above-described model for recognizing non-text lines. Furthermore, the image processing unit 21 may be able to determine the content of the text by using the AI of the natural language processing. In this case, analysis by using a distributed word expression, semantic analysis of text, similarity search, and the like, can be performed. In addition, the AI of the natural language processing can be added to the above-described advertisement recognition model. In the model for recognizing the advertisement, if a trademark, a logo, a specific phrase, a currency symbol, an address, a telephone number, and the like, are included, the advertisement can be determined.

The network transmitting/receiving unit 25 is a network connecting unit including a LAN board, a wireless transceiver, or the like for connecting to the network 5.

The storage unit 29 is a storage unit by using a non-transitory recording medium. The storage unit 29 may include a RAM, a ROM, an eMMC, an SSD, an HDD, and the like. The storage unit 29 stores a control program for controlling the operation of the information processing apparatus 2. The control program includes programs and data such as an OS, a service (daemon) for performing pull print, a device driver, and various applications, and the like. The service (daemon) may be, for example, a WWW server by using the HTTP protocol and various server-side applications.

Further, the storage unit 29 may include an external storage medium such as various flash memories and optical recording media.

Note that the control unit 20 and the image processing unit 21 may be integrally formed as a CPU with a built-in GPU, a chip-on-module package, an SOC, or the like.

Further, the control unit 20 and the image processing unit 21 may include a RAM, a ROM, a flash memory, or the like.

Further, the control unit 20 reads out the control program stored in the storage unit 29, expands and executes the control program, and thereby operates as each unit of a functional block as described later. Furthermore, the control unit 20 can execute at least a part of the process of the image processing unit 21.

[Functional Configuration of Image Forming System X]

Figure 5:
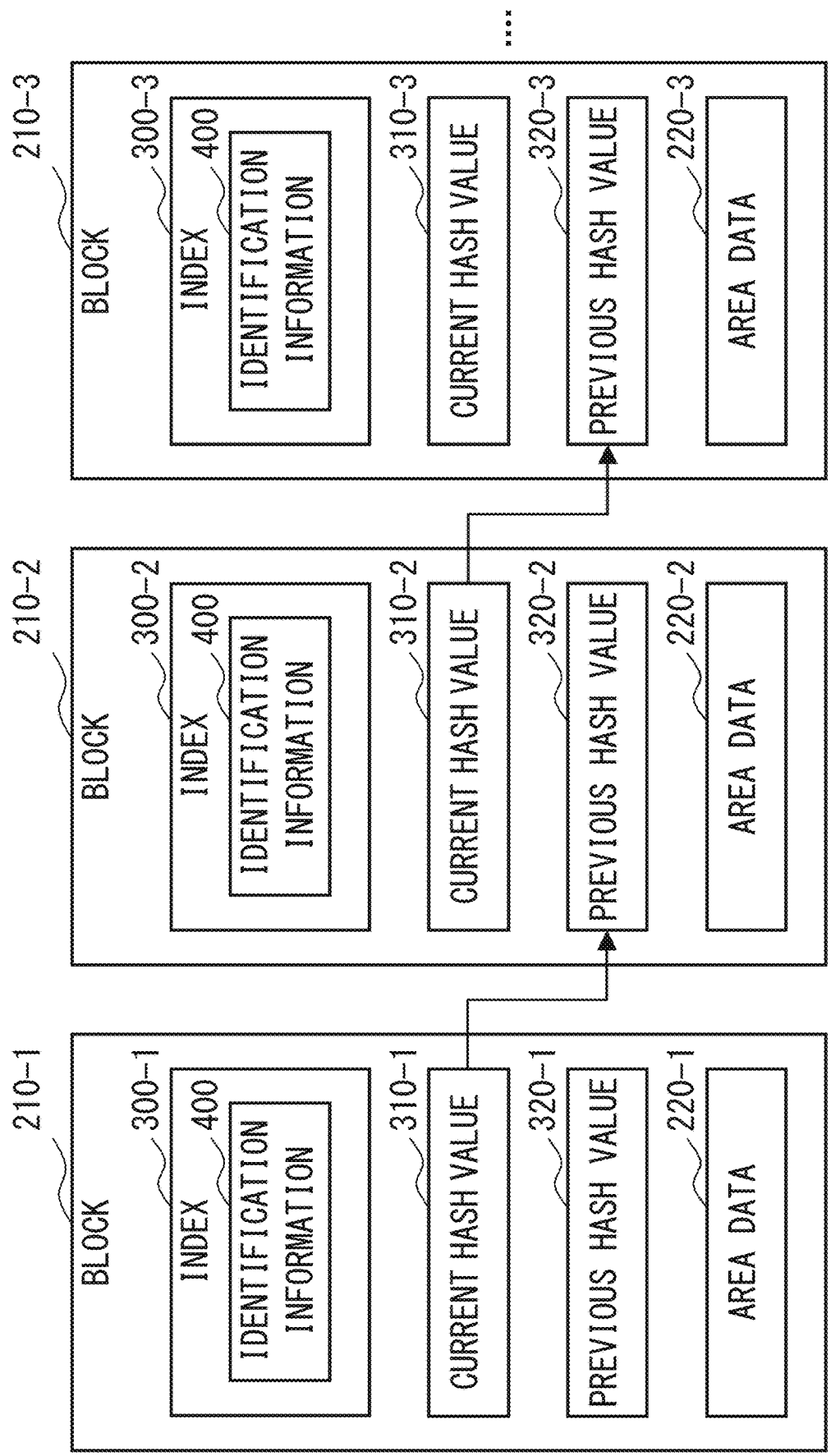
FIG. 5 is a block diagram showing a detailed configuration of the blockchain as shown in FIG. 4.

Here, the functional configuration of the image forming system X is described with reference to FIGS. 4 and 5.

The control unit 10 of the image forming apparatus 1 includes an area classification unit 100, a blockchain creation unit 110, a block transmission unit 120, a block acquisition unit 130, and a document output unit 140.

The control unit 20 of the information processing apparatus 2 includes a block reception unit 150 and a block retransmission unit 160.

The storage unit 19 stores image data 200, blockchain C (block 210-1 to 210-*n*), and document data 230.

The storage unit 29 stores block 210-*m*.

The area classification unit 100 classifies the image data 200 read by the document reading unit 12 of the image forming apparatus 1 into area data 220 for each content. In this embodiment, the area classification unit 100 can recognize each area from each page of the document by AI, or the like, and classify each area into any of a text, a table, an image, or the like. At this time, the area classification unit 100 can also determine information such as the accuracy of classification and the state of the area. In addition, the area classification unit 100 can perform high-speed processing at the time of classification by using the AI accelerator of the image processing unit 21, or the like.

The blockchain creation unit 110 creates the block 210 in which the identification information 400 is added to the area data 220 classified by the area classification unit 100. Then, the blockchain creation unit 110 creates the blockchain C of the document by sequentially calculating and including the previous hash value of the previous block 210.

The block transmission unit 120 transmits the block 210 created by the blockchain creation unit 110 to the information processing apparatus 2. The block transmission unit 120 transmits the block 210 including the area data 220 classified into text or table to the information processing apparatus 2 capable of optical character recognition. Alternatively, the block transmission unit 120 transmits the block 210 including the area data 220 classified into images to the information processing apparatus 2 having high image processing performance.

The block acquisition unit 130 acquires the block 210 processed by the information processing apparatus 2. Alternatively, the block acquisition unit 130 can also acquire the block 210 in which the area data 220 is deleted by the information processing apparatus 2.

The document output unit 140 collectively reconstructs the blocks 210 acquired by the block acquisition unit 130 into the document data 230 and outputs the document data 230. Specifically, the document output unit 140 collects the area data 220 processed by each information processing apparatus 2, reconstructs the area data 220 into document data 230, and outputs the document data 230. At this time, the document output unit 140 does not have to collect the area data 220 deleted by the information processing apparatus 2.

The block reception unit 150 receives the block 210 from the image forming apparatus 1 and stores it in the storage unit 29.

The block retransmission unit 160 retransmits the block 210 including the area data 220 processed by the image processing unit to the image forming apparatus 1 or another information processing apparatus 2.

In the present embodiment, the document reading unit 12 of the image forming apparatus 1 reads the document page by page and outputs it as image data 200.

In the present embodiment, the image processing unit 21 of the information processing apparatus 2 processes or deletes the area data 220 for each block 210 received by the block reception unit 150. Specifically, in the present embodiment, the image processing unit 21 can process the area data 220 included in the block 210 and output the area data 220 including text data and/or table data. Further, the image processing unit 21 recognizes an image not related to the content of the text and perform deletion process. This image not related to the content of the text include an advertisement, ab illustration, a logo, and the like.

The image data 200 is image data scanned by the document reading unit 12 of the image forming apparatus 1. As the image data 200, image data 200 of various still images such as JPEG (JPG), TIFF, RAW (raw) bitmap, BMP, GIF, PNG, or the like, can be used. The image data 200 may have a high resolution, a large amount of color information, a low reflection portion of light, and may be suitable for OCR. That is, when the OCR is performed by using the image data 200, the erroneous recognition may be reduced.

The blockchain C is composed of blocks 210-1 to 210-$n$ and blocks 210-$m$, which are blocks of data. Hereinafter, when showing any one of these, it is simply referred to as the block 210.

Details of the blockchain C is described later.

The document data 230 is electronic document data 230 such as PDF (Portable Document Format), PS (Post Script), XML (Extensible Markup Language), a word processor file, a spreadsheet file, a presentation software file, or the like. The document data 230 may include text data, image data, and other binary data. Of these, the text data may include structured data described in a markup language such as XML, and the like. This structured data includes information on forms and tables, information on the above-mentioned areas, page information, printing properties, and other meta information, and the like. The image data 200 may be data of the type included in the electronic document data 230 such as JPEG, TIFF, GIF, PNG, and the like.

Here, the control unit 10 of the image forming apparatus 1 is caused to function as the area classification unit 100, the blockchain creation unit 110, and the document output unit 140 by executing the control program stored in the storage unit 19.

The control unit 20 of the information processing apparatus 2 is caused to function as the block reception unit 150 and the block retransmission unit 160 by executing the control program stored in the storage unit 29.

In addition, each unit of the image forming apparatus 1 and the information processing apparatus 2 described above may be a hardware resource that executes the image reading method of the present disclosure.

It should be noted that a part or an arbitrary combination of the above-described functional configurations may be configured by IC, programmable logic, FPGA (Field-Programmable Gate Array), or the like in terms of hardware or circuit.

Then, details of the blockchain C are described with reference to FIG. 5.

Each block 210-1 to 210-$n$ includes an index 300, a current hash value 310, a previous hash value 320, area data 220, and the like.

The index 300 is header data of each block 210 and the like. The header data includes, for example, an identifier indicating a block of the image forming system X, a number in the arrangement order of each block, each definition of a data structure, and data such as an encryption method.

In addition, the index 300 includes identification information 400.

The identification information 400 is, for example, a checksum or hash value of all the area data 220, a job ID (Identification), and other unique IDs, or the like. That is, in the present embodiment, as the identification information 400, a value with which the output document data 230 can be identified is used. This hash value can be calculated by various hash functions that generate a fixed-length bit string having no regularity from an arbitrary-length bit string. For the following hash values, each hash value can be calculated with similar hash function.

In addition, the index 300 may include output settings necessary for printing the document data 230. Specifically, the output setting may include, for example, the reading setting of the document acquired by the operation panel unit 16 of the image forming apparatus 1, the information included in the header of the document data 230, the job information, the print settings such as paper, color, aggregate printing, or the like, encryption key, and the like (hereinafter, referred to as "header and the like").

The current hash value 310 is the hash value of the area data 220 of this block 210. Alternatively, the current hash value 310 may be a calculated hash value of whole data of this block 210.

The previous hash value 320 is a hash value of the area data 220 of the previous block 210. This may be, for example, stored by copying the current hash value 310 of the previous block 210 in the order, which is included in the index 300. That is, as shown in FIG. 5, the previous hash value 320 of block 210-2 is the same as the current hash value 310-1 of block 210-1, and the previous hash value 320 of block 210-3 is the same as the current hash value 310-2 of block 210-2. Here, the previous hash value 320 of the block 210-1 may include a specific number such as "0" or the like, or an indefinite number.

The area data 220 is image data for each area classified by the area classification unit 100 on each page of the document. In the present embodiment, the area data 220 includes image data cut out from the image data 200. The area data 220 may include text data after OCR, structure data of a table, image data that has been processed or improved in image quality, or the like, or may be replaced by these. Alternatively, when the deletion processing is performed, the area data 220 may be data in a state in which a blank or a "NULL" value is written. In this embodiment, the area data 220 may be encrypted.

Data other than these may be added to the first block 210-1 and/or the last block 210-$n$.

[Document Read Processing by Image Forming System X]

Next, with reference to FIGS. 6 to 9, the document reading process by the image forming system X according to the embodiment of the present disclosure is described.

In the document reading process of the present embodiment, the document reading unit 12 of the image forming apparatus 1 acquires the image data 200 of the document in page units. Then, the captured image data 200 is classified into areas for each content. A blockchain C is created by dividing each of the classified areas. Each block 210 is transmitted to the information processing apparatus 2, the content is recognized, and is processed to be output as area data 220 or deleted. Then, the block 210 including the processed area data 220 is retransmitted to the image forming apparatus 1. The image forming apparatus 1 receives these blocks 210, collects them for each area, reconstructs them into the document data 230, and outputs the document data 230.

In the document reading process of the present embodiment, the control unit 10 and the control unit 20 mainly execute the programs stored in the storage unit 19 and the storage unit 29 in cooperation with the respective units and using hardware resources.

Figure 6:
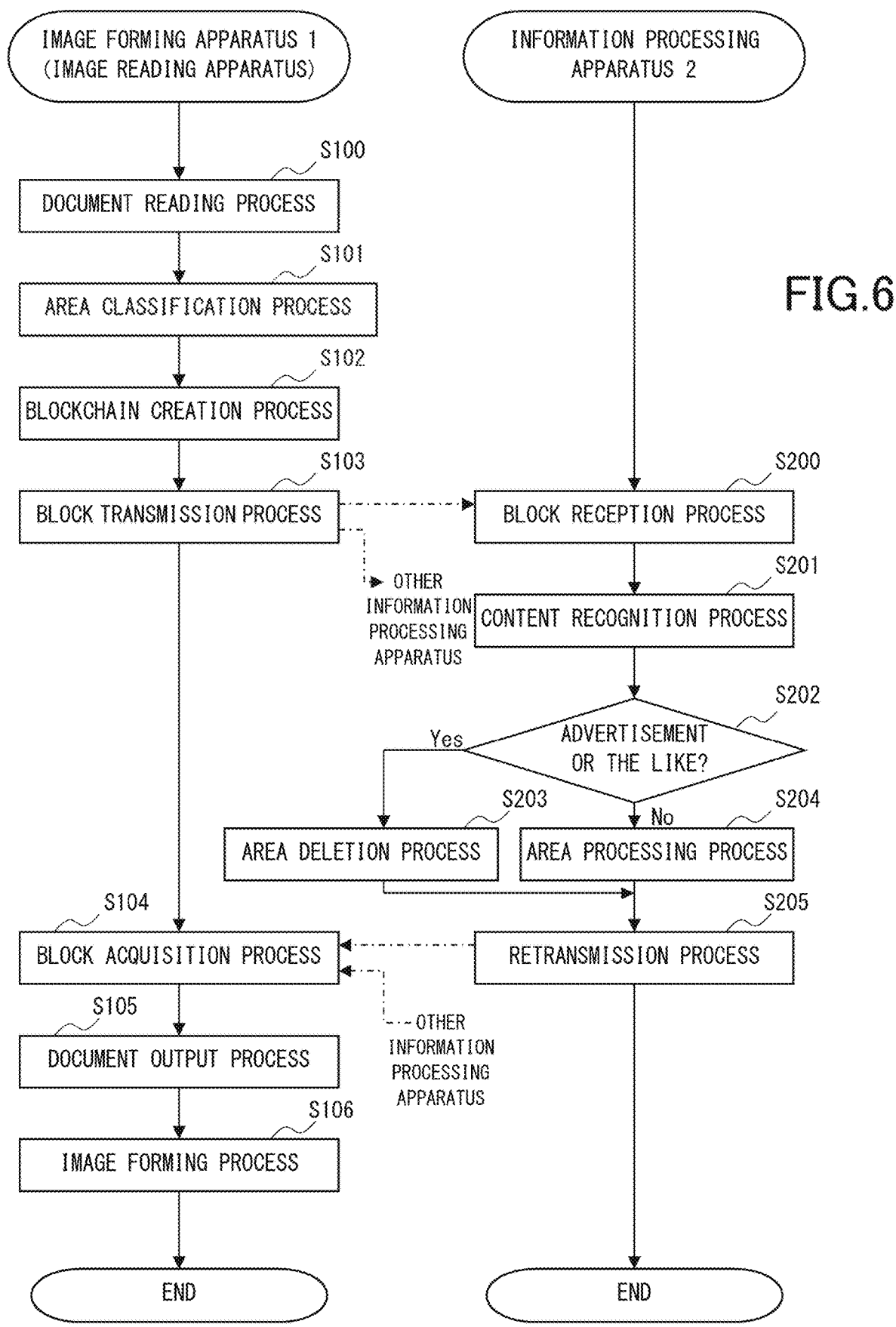
FIG. 6 is a flowchart of a document reading process according to the embodiment of the present disclosure.

Hereinafter, with reference to the flowchart of FIG. 6, the details of the document reading process of the present embodiment is described step by step.

(Step S100)

First, the operation panel unit 16 and the document reading unit 12 of the image forming apparatus 1 perform a document reading process.

Here, the user places a document on the document placing unit of the document feeding unit 13 and gives an instruction to read the document on the operation panel unit 16. At this time, the user can set read setting such as the format and the necessity of an image for the document data 230 created after reading. The read setting includes a file format, a color, a partial color, or black and white setting, resolution setting, or the like, in addition to setting of printing and transmission. Further, as the read setting, whether or not to delete the handwritten comment, the drawing, the highlighted marker, or the like, can be set.

Further, the user can also set an output instruction such as designation of a transmission place of the read document data 230 after reading, storage in a document box, printing of a document in the image forming unit 17, and the like as the read setting.

The operation panel unit 16 that has acquired these instructions transmits a command for reading the document to the document reading unit 12.

Then, the document reading unit 12 scans the documents one by one, acquires the image data 200, and stores the image data 200 in the storage unit 19. At this time, the image processing unit 11 can temporarily perform image quality enhancement processing on the entire image data 200.

FIG. 7 shows an example of the read image data 200.

(Step S101)

Here, the area classification unit 100 of the image forming apparatus 1 performs area classification process.

The area classification unit 100 acquires the image data 200 read by the document reading unit 12 and stores it in the storage unit 19 together with the read setting.

Then, the area classification unit 100 classifies the image data 200 into areas for each content. In the present embodiment, first, the area classification unit 100 performs geometric layout analysis using, for example, various AI models, or the like, of the image processing unit 11.

Specifically, the area classification unit 100 uses the image processing unit 11 to acquire, for example, the ground color, recognize the page margin of the image data 200, and recognize the page number and the index. Then, the area classification unit 100 recognizes a group of characters or images of the image data 200 as an area from a main body part of text other than these. The area classification unit 100 can recognize this area based on a blank, an outline, and geometric information.

Then, the area classification unit 100 classifies the content of the recognized area. Specifically, the area classification unit 100 classifies areas into any of text, table, and image and labels them. At this time, the area classification unit 100 also analyzes the accuracy of classification, the state of the area, and the like, and performs labeling. The area classification unit 100 can recognize, as the state of the area, whether the area is in color, partial color, or monochrome. Further, the area classification unit 100 can recognize, as the state of the area, the presence or absence of a stain, a poorly printed portion, or a blur or unclear portion (hereinafter, simply referred to as "the stain"). Furthermore, in the case of the text or the table, the area classification unit 100 can analyze whether or not OCR is possible due to the stain, or the like. Specifically, when the stain or the like is equal to or larger than a specific stain threshold, the area classification unit 100 analyzes OCR is impossible because the false recognition rate in OCR becomes too high.

The area classification unit 100 converts, for example, a portion recognized as an area in the image data 200 into image data such as a bitmap and cuts it out. Then, the area classification unit 100 adds the page number and area position (coordinate) data, analysis result labeling data, and read setting data to the image data as metadata, and the like. The area classification unit 100 stores the data to which the metadata, and the like, are added in the storage unit 19 as area data 220.

Figure 8:
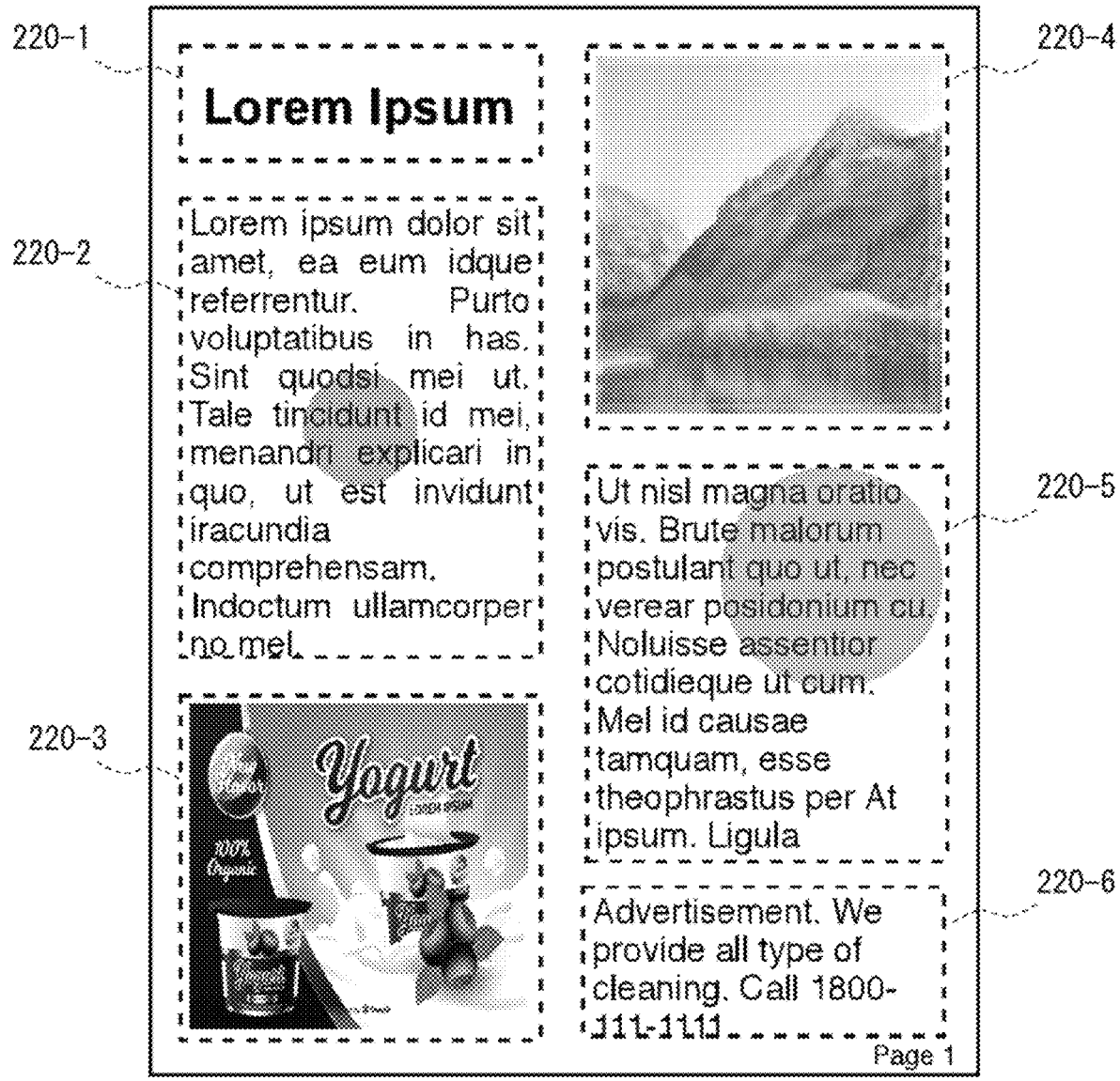
FIG. 8 is a conceptual diagram of the area classification process as shown in FIG. 6.

FIG. 8 shows an example in which area data 220-1 to 220-6 are recognized from the image data 200 of FIG. 7. In this example, the area data 220-1, 220-2, 220-5, 220-6 are recognized as texts, and the area data 220-3, 220-4 are recognized as images.

(Step S102)

Next, the blockchain creation unit 110 performs a blockchain creation process.

Here, for example, the blockchain creation unit 110 creates the identification information 400. Then, the blockchain creation unit 110 creates the block 210 in which the identification information 400 is added to each area data 220 classified by the area classification unit 100. Of these, it is preferable to use a fixed value such as 128 KB (Kiro byte), 256 KB, 512 KB, or the like, for the size of each block 210. Alternatively, the size of each block 210 may be variable depending on the total number of the image forming apparatuses 1 and the information processing apparatuses 2 configuring the image forming system X, the size of the area data 220, and the like. Further, the size of the first and/or last block 210 may be different than the size of the other blocks 210.

In the present embodiment, for example, the blockchain creation unit 110 causes each area data 220 to be sequentially included in the blocks 210-1 to 210-*n*. At this time, each area data 220 may be encrypted. This encryption is performed by using, for example, public key cryptography or secret key cryptography. Furthermore, when the capacity of the area data 220 is larger than the above-mentioned fixed value, the blockchain creation unit 110 can store the area data 220 across a plurality of blocks 210. In this case, it can be set to the index 300 of these blocks 210 that the area data 220 is divided. After that, the blockchain creation unit 110 creates the blockchain C by sequentially calculating and including the previous hash value of the previous block 210 in each block 210. Specifically, for example, the blockchain creation unit 110 can calculate and include the previous hash value 320 of the previous block 210 in order from the block 210-*n*.

(Step S103)

Next, the block transmission unit 120 performs block transmission process.

The block transmission unit 120 transmits each of the blocks 210-1 to 210-*n* created by the blockchain creation unit 110 to the information processing apparatus 2.

For this process, the block transmission unit 120 performs the broadcast, or the like, and acquires the performance information from the information processing apparatus 2 that is responded.

Then, the block transmission unit 120 can examine the performance of each information processing apparatus 2 and can transmit each block 210 to an appropriate information processing apparatus 2.

Specifically, the block transmission unit 120 transmits the block 210 including the area data 220 classified into a text or a table to the information processing apparatus 2 capable of OCR. The block transmission unit 120 can also transmit the block 210 including the area data 220 classified into images to an information processing apparatus having high image processing performance. Here, when one area data 220 is included in a plurality of blocks 210, it is preferable to transmit the plurality of blocks 210 to the same information processing apparatus 2.

In addition, the block transmission unit 120 may lower the priority of transmission of the block 210 to the information processing apparatus 2 that is likely to be in the offline state. Conversely, the block transmission unit 120 may increase the priority of transmission of the block 210 to the information processing apparatus 2 having a high processing capacity and/or a new installation year. Furthermore, the block transmission unit 120 may suppress transmission of the block 210 to the information processing apparatus 2 that is expected to cause an error.

In this way, the blocks 210-1 to 210-n of the blockchain C are transmitted to the information processing apparatuses 2 of the nodes forming the image forming system X, whereby the image processing and the like can be performed in a distributed manner.

Note that the block transmission unit 120 may calculate the transmission/reception time of the block 210. In addition, if the image forming apparatus 1 performs the processing earlier, the block transmitting unit 120 may cause the image processing unit 11 to execute the following processes without transmitting the block 210.

(Step S200)

Here, the block reception unit 150 of each information processing apparatus 2 performs block reception process.

The block receiving unit 150 receives the block 210 (each block 210-m) from the image forming apparatus 1 and stores it in the storage unit 29.

(Step S201)

Here, the image processing unit 21 performs content recognition processing.

The image processing unit 21 performs image recognition on the area data 220 included in the received block 210.

When the area is classified into a text, the image processing unit 21 recognizes, for example, the states of a column, a paragraph, and a line, and recognizes the character portion. When the area is a table, the image processing unit 21 recognizes, for example, a form and a character portion. Then, the image processing units 21 all perform OCR on the character portion. In addition, when OCR is possible, the image processing unit 21 analyzes the content of the recognized text by natural language processing.

In the case of an image, the image processing unit 21 recognizes a non-text line, a symbol, an illustration, a logo, a photograph, and the like. The image processing unit 21 also recognizes these imaging objects.

Further, the image processing unit 21 can also recognize an advertisement by using a model that recognizes an advertisement, which is a combination of various models.

(Step S202)

Next, the image processing unit 21 determines whether the content of the area is an advertisement, or the like.

The image processing unit 21 determines Yes if the content of the area is determined to be an advertisement by the model that recognizes the advertisement. Furthermore, the image processing unit 21 determines Yes even when the area is classified as an image and the user sets that the image is not required. The image processing unit 21 determines No in other cases.

In the case of Yes, the image processing unit 21 advances the process to step S203.

In the case of No, the image processing part 21 advances a process to step S204.

(Step S203)

In the case of an advertisement or the like, the image processing unit 21 performs area deletion process.

The image processing unit 21 deletes the area data 220 from the block 210. As a result, the area determined to be the advertisement, or the like, is not outputted and is deleted.

After that, the image processing unit 21 advances the process to step S205.

(Step S204)

If it is not an advertisement or the like, the image processing unit 21 performs area processing process.

As the processing, the image processing unit 21 first converts the area data 220 into monochrome or partial color when the area is monochrome or partial color. The same applies when monochrome or partial color is designated as the format of the document data 230 by the user. Alternatively, the image processing unit 21 also converts a text, an image, or the like described in a single color close to black into monochrome. In this way, if not necessary to use full color, reducing the size of the area data by converting it into monochrome or partial color is possible.

Further, when the area is classified as the text, the image processing unit 21 can replace the area data 220 with the OCR text data and delete the image data 200. This also removes the stain and the like. Alternatively, the image processing unit 21 may add text data to the area data 220 as "transparent text" depending on the format of the document data 230. In addition, the image processing unit 21 may delete the handwritten comment, the drawing, the marker, and the like, from the image of the area data 220 when the setting is such that the handwritten comment, the drawing, and the marker, and the like, are deleted as the format of the document data 230. Furthermore, the image processing unit 21 may perform a check by a spell checker to detect and correct an error in character recognition of OCR, an erroneous writing of the original document, and the like.

When the area is classified as a table, the image processing unit 21 detects the location of the form and includes or replaces it in the area data 220 as vector data or table structure data corresponding to the format of the document data 230. At this time, the image processing unit 21 includes the text portion recognized by the OCR in this form and outputs it. Further, if the processing to consider the semantics of the document is necessary, the image processing unit 21 performs the processing to consider this. This is a case, for example, when it is necessary to perform processing in consideration of the meaning of the terms of the text arranged in the form. Specifically, if there is a "total" field and a blank or character cannot be recognized, this may be calculated and output it, or the like.

When the area is classified as the image, the image processing unit 21 performs image processing process such as rotation and distortion (skew) correction, density adjustment, gradation adjustment, and image improvement on the area data 220, and the like. Specifically, the image processing unit 21 can optimize the image by performing skew correction, and then correcting brightness, hue, exposure, or the like, ground color removal, stain removal, noise removal, or the like. Further, an AI such as a GAN (Generative Adversarial Network) may be used to generate and replace an object similar to the recognized imaging object to sharpen the image. The image processing unit 21 replaces these image-processed image data with the original area data 220 as processed data.

Figure 9:
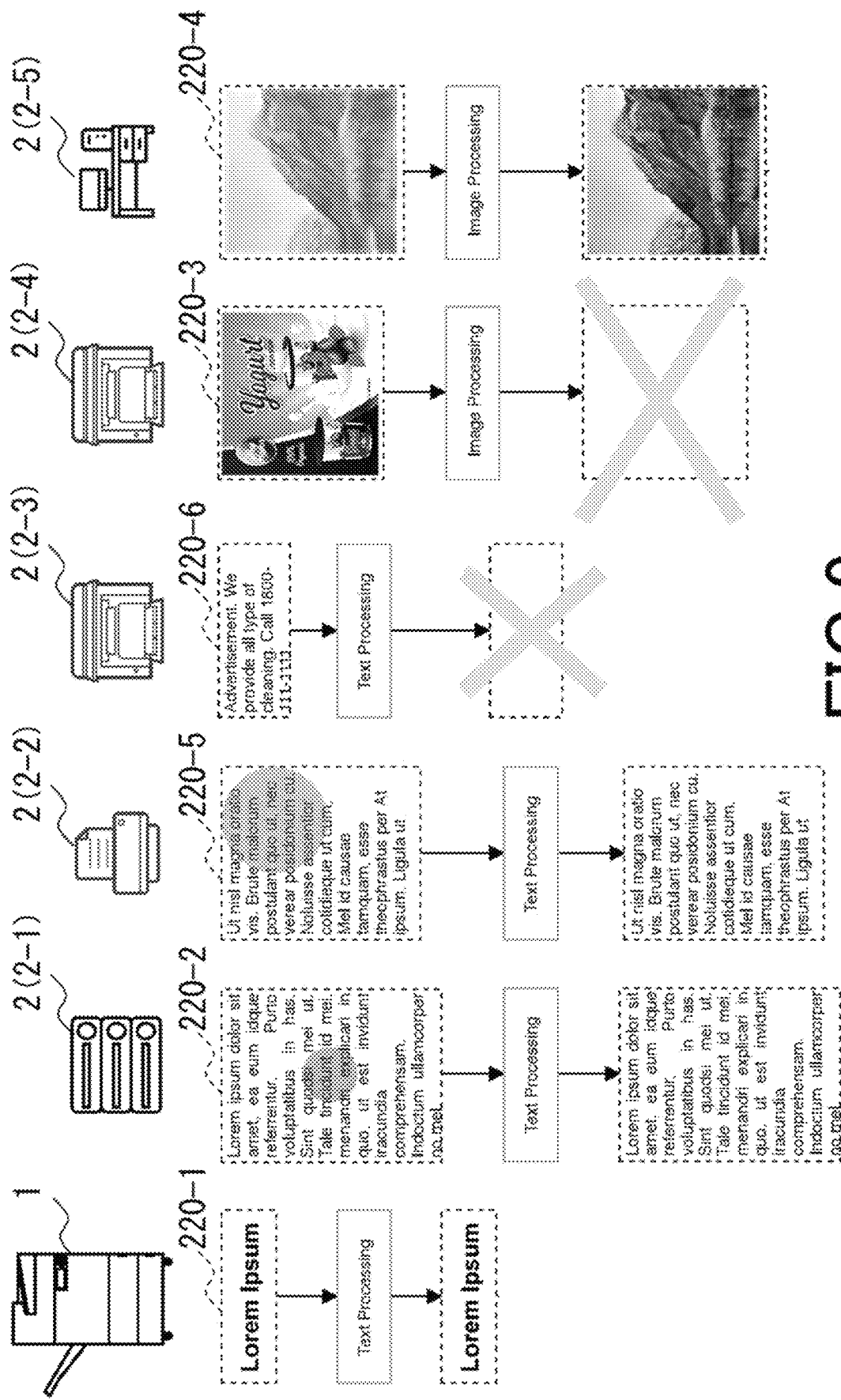
FIG. 9 is a conceptual diagram of the area processing process and area deletion process as shown in FIG. 6.

An example of the processing area output processing is described with reference to FIGS. 7, 8, and 9.

The area data 220-1 is an example, which is classified as text, is determined to be a title, and is output text only. As shown in FIG. 9, in this example, since the area data 220-1 has a small rectangular size, it is processed by the image processing unit 11 in consideration of the time when transmitting and receiving the block 210.

The area data 220-2 is an example, which is classified as text, is determined to be related to other text, and is output the text only. Here, as shown in FIG. 9, the information processing apparatus 2-1, which is a server, performs OCR processing at high speed. Then, the stains, and the like, indicated by light-colored circles in FIG. 8 are removed.

Although the area data 220-3 is classified as an image, the information processing apparatus 2-4, which is an MFP, recognizes it as an advertisement image and deletes it.

The area data 220-4 is classified as an image, is subjected to image processing, and is replaced with the processed image data 200. Here, as shown in FIG. 9, for example, an example in which the image processing is performed by the information processing apparatus 2, which is a PC including a GPU, or the like, and capable of high-speed image processing, is shown.

The area data 220-5 is an example that is classified as text, is determined to be related to other text, and is output the text only, and a stain, and the like, is removed. Here, an example is shown in which the OCR process is performed by the information processing apparatus 2, which is a document scanner capable of high-speed OCR.

The area data 220-6 is an example that is classified as the text, however, is deleted by the information processing apparatus 2-3, which is an MFP, because the advertisement is determined to be an advertisement not related to the other text. Here, both the OCR text and the area data 220-6 may be deleted from the block 210.

(Step S205)

Here, the block retransmission unit 160 performs retransmission process.

The block retransmission unit 160 retransmits the block 210 including the area data 220 processed by the image processing unit to the image forming apparatus 1 or another information processing apparatus 2. Here, when the area processing process or the area deletion process is completed, the block retransmission unit 160 may transmit the block 210 to the image forming apparatus 1 immediately or may transmit the block 210 after waiting for the user's instruction to output the document data 230. Further, the block retransmission unit 160 may retransmit the block 210 to another information processing apparatus 2 and cause it to execute the process. This may be, for example, a case where the apparatus is busy for other processing, the OCR or image processing function cannot be used due to a failure, or the like.

(Step S104)

Here, the block acquisition unit 130 of the image forming apparatus 1 performs a block acquisition process.

The block acquisition unit 130 acquires the block 210 processed by the information processing apparatus 2 and stores it in the storage unit 19.

Note that the image forming apparatus 1 that acquires the block 210 may be another apparatus that outputs.

Specifically, the block acquisition unit 130 acquires the blocks 210-1-2 to 210-n from any of the information processing apparatus 2 and stores them in the storage unit 19.

At this time, the block acquisition unit 130 acquires in reverse order from the last block 210 to the first block 210 in the order of the index 300. That is, in this process, the blocks 210 from the block 210-n to the block 210-1 are acquired.

Therefore, the block acquisition unit 130 may instruct to transmit the processed block 210-m by performing a broadcast, or the like, on the network 5.

Upon acquiring the block 210-m, the block acquisition unit 130 recalculates the current hash value 310 of the encrypted data 330-m of the block 210-m. Then, the block acquisition unit 130 confirms that the calculated value is the same as the previous hash value 320 of the block 210 in the next order and is correct. If these values are different, the block acquisition unit 130 determines that the block 210 has been tampered with or the data has been damaged. In this case, the block acquisition unit 130 may acquire the correct block 210-m again or may decide to be an error.

When acquiring the correct block 210-m, the block acquisition unit 130 repeatedly acquires the preceding block 210 from the information processing device 2 that is the node including the preceding block 210. As a result, the block acquisition unit 130 acquires the blocks 210-1 to 210-n of the entire blockchain C.

(Step S105)

When all the blocks 210 of the blockchain C have been acquired, the document output unit 140 performs a document output process.

The document output unit 140 decodes each area data 220 for the acquired blocks 210-1 to 210-n. Then, the document output unit 140 collects the area data 220 of the same page and reconstructs it into the document data 230. At this time, the document output unit 140 processes all the pages.

Figure 10:
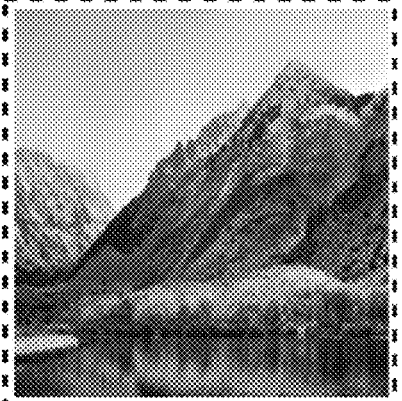
FIG. 10 is a diagram showing an example of the document data created by the document output process as shown in FIG. 6.

In the example of the area data 220 of FIG. 10, as described above, the area data 220-1, the area data 220-2, the area data 220-4, and the area data 220-5 are arranged on the same page as like the image data 200.

(Step S106)

Next, the document output unit 140 and the image forming unit 17 perform image forming process.

The document output unit 140 causes the image forming unit 17 of the image forming apparatus 1, and the like, to form an image of the document data 230. In this case, the image forming unit 17 forms an image of the document data 230 and records it on recording paper. Alternatively, the document output unit 140 can send the document data 230 by facsimile or store the document data 230 in the document box of the storage unit 19.

In addition, the image forming apparatus 1 that performs this image forming process may be an output apparatus other than the one that has read the document. Further, process corresponding to the output instruction may be performed, such as transmission to a location designated by the user, or the like.

With the above, the document reading process according to the embodiment of the present disclosure is completed.

With the above configuration, the following effects can be obtained.

In a typical technique, reading and image processing are performed by the same apparatus, which is one MFP. Otherwise, OCR, or the like, are performed on a dedicated server. For this reason, one apparatus is overloaded in image processing including OCR, or the like.

On the other hand, the image forming system X according to the embodiment of the present disclosure is an image reading system including the image forming apparatus 1 (image reading apparatus) and the information processing apparatus 2, and the image forming apparatus 1 includes: a document reading unit 12 configured to read a document in page units and outputs an image data 200, an area classification unit 100 configured to classify the image data 200 read by the document reading unit 12 into area data 220 for each content, a blockchain creation unit 110 configured to create a blockchain C of the document by creating a block 210 in which identification information 400 is added to the area data 220 classified by the area classification unit 100, and calculating and including a previous hash value of previous block 210 in order, a block transmission unit 120 configured to transmit the block 210 created by the blockchain creation unit 110 to the information processing apparatus 2, a block acquisition unit 130 configured to acquire the block 210 processed by the information processing apparatus 2, and a document output unit 140 configured to collectively reconstruct the block 210 acquired by the block acquisition unit into document data 230 and output the document data 230; and the information processing apparatus 2 includes: a block reception unit 150 configured to receive the block 210 from the image reading apparatus 1, and an image processing unit 21 configured to process or delete the area data 220 for the block 210 received by the block reception unit 150, a block retransmission unit 160 configured to retransmit the block 210 including the area data 220 processed by the image processing unit 21 to the image reading apparatus 1 or another information processing apparatus 2.

With this configuration, the image data 200 acquired by the image forming apparatus 1 can be divided into blocks 210 for each area and processed by the information processing apparatus 2. As a result, the image data 200 can be dispersed and image-processed. That is, to reduce the load on the image forming apparatus 1 and output high-quality document data 230 at high speed can be archived. Further, the optimum document data 230 can be acquired by performing processing or deletion based on the classification of the area.

Further, in the image forming system X according to the embodiment of the present disclosure, the area classification includes a text, a table, and an image; the block transmission unit 120 transmits the block 210 including the area data 220 classified into the text or the table to the information processing apparatus 2 capable of optical character recognition; and the image processing unit 21 of the information processing apparatus 2 processes the area data 220 included in the block 210 and outputs the area data 220 including text data and/or table data.

With this configuration, various types of documents can be efficiently processed according to the analysis of the text, table, and image for each area, and the optimum document data 230 can be acquired. Furthermore, by performing process according to the area classification, to reduce the processing load and save computational resources can be archived. In addition, by performing process according to the text, the table, and the image, to provide the document data 230 that is easy to see and has a reduced data amount are possible.

Further, in the image forming system X according to the embodiment of the present disclosure, the block transmission unit 120 transmits the block 210 including the area data 220 classified into images to the information processing apparatus 2 having high image processing performance.

With this configuration, the information processing apparatus 2 that is optimal for image processing can perform processing. As a result, the document data 230 can be acquired at high speed.

Further, in the image forming system X according to the embodiment of the present disclosure, the image processing unit 21 recognizes and deletes an area that is not related to the content of another text (other text).

With such a configuration, the unnecessary area can be deleted from the document data 230, and the document data 230 that is easy to view can be provided. Further, the storage capacity of the document data 230 can be reduced.

Furthermore, the image forming system X according to the embodiment of the present disclosure is that an image not related to the content of the other text includes an advertisement, an illustration, and a logo.

With such a configuration, advertisements, and the like, can be efficiently removed.

Other Embodiments

In addition, in the above-mentioned embodiment, the example in which the block including the area data 220 in each block is used is described, as the blockchain C.

However, the block including the area data 220 may be added as another block.

Figure 11:
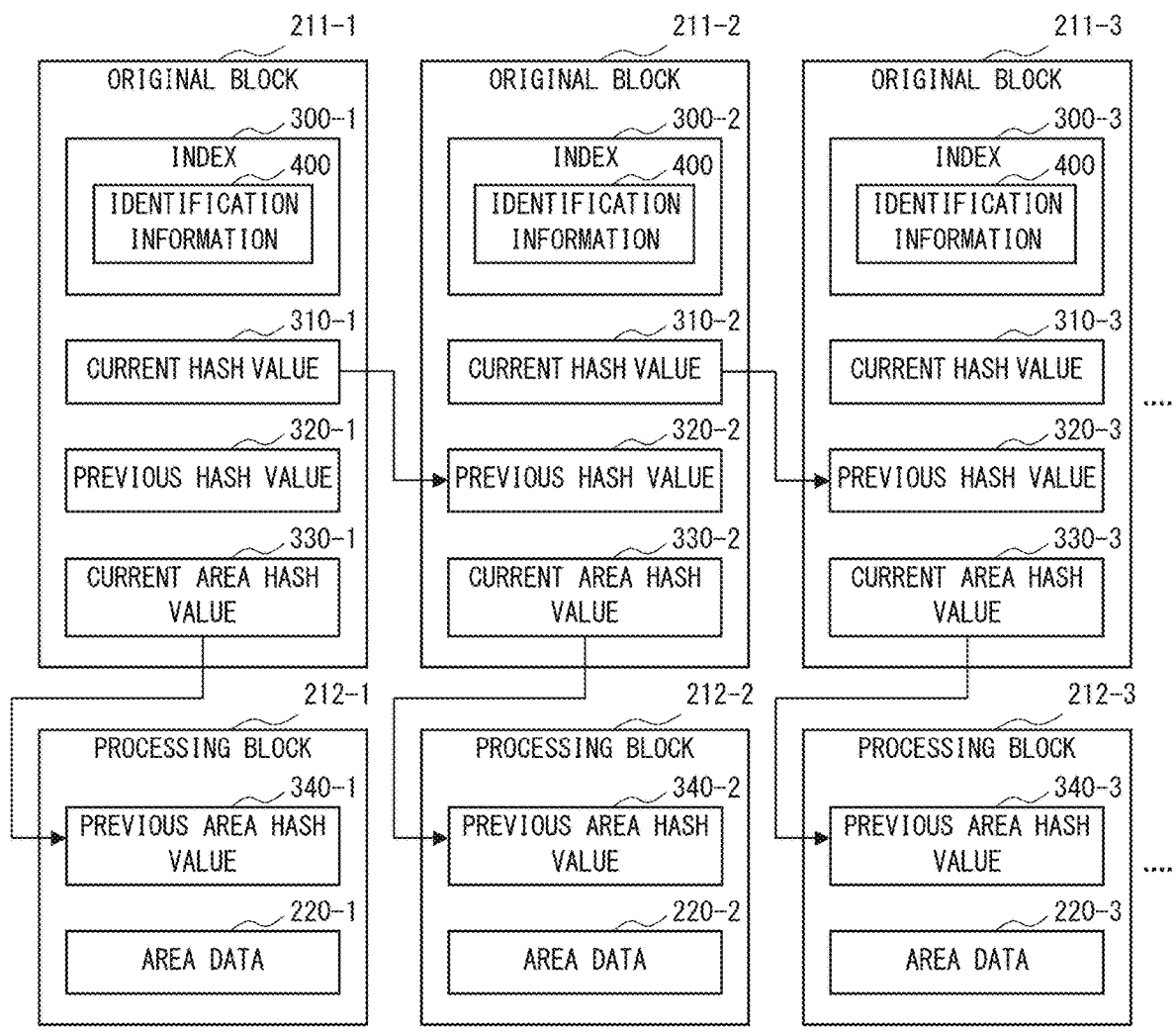
FIG. 11 is a block diagram showing a detailed configuration of a blockchain according to another embodiment of the present disclosure.

FIG. 11 shows an example of the configuration of such a blockchain C2. The blockchain C2 in this example includes one original block 211 (211-1 to 211-*n*) for each area and a corresponding processing block 212 (212-1 to 212-*n*). The processing block 212 includes area data 220 (220-1 to 220-*n*) of each area, respectively. These are combined with the current area hash values 330-1 to 330-*n* and the previous area hash values 340-1 to 340-*n*. In addition, a plurality of processing blocks 212 may be included in each area.

With this configuration, when deleting the area data 220, it suffices to remove the association of the processing block 212-*m* from the corresponding original block 211-*m*. This makes it possible to reduce the data amount itself of the blockchain C2. Furthermore, even if the area data 220 is large data, the length and capacity of the original blocks 211-1 to 211-*n* do not change, so that the consistency of the blockchain C2 can be easily maintained.

In the above-described embodiment, an example has been described in which the locations of the rectangular coordinate data of the image data 200 are classified into a plurality of areas.

However, the number of areas may be one in one page. Further, the area may be a polygon, or the like, that is not a rectangle. Also, the area may be set within or with overlapped another rectangle, polygon, or the like, within the rectangle, the polygon, or the like.

In addition, the text, the table, and the image may be classified or selected as an area in a mixed state, respectively.

With this configuration, a flexible configuration can be accommodated.

In the above embodiment, an example in which the image processing unit 21 performs various processes such as AI has been described.

However, part or all of the processing of the above-described image processing unit 21 may be performed by the control unit 10, the image processing unit 11, the control unit 20, an external client PC, another MFP, a server, a so-called "cloud" service or server, or the like.

With this configuration, it is possible to efficiently execute image processing, and the like.

In the above embodiment, an example in which one information processing apparatus 2 processes one or more blocks 210 has been described.

However, the same block 210 can be processed by the image processing units 21 of the plurality of information processing apparatuses 2, or the like.

With this configuration, even if one information processing apparatus 2 cannot execute image processing, or the like, acquiring the processed block 210 from another information processing apparatus 2 can be performed. Further, by acquiring the processed block 210 from the information processing apparatus 2 having a high execution speed, the document data 230 can be quickly output. Alternatively, it is possible to provide more accurate document data 230 by acquiring the block 210 with higher OCR accuracy, the block 210 with higher image processing accuracy, and the like.

In the above-described embodiment, an example in which the area is deleted by making a determination in block 210 units has been described.

However, the area to be deleted may be determined in relation to other text after viewing the page or the entire document.

With such a configuration, the possibility that the advertisement is not deleted or that content of the document is accidentally deleted can be reduced, and the document data 230 from which the advertisement is surely removed can be provided.

In the above-described embodiment, the example in which the area data 220 is arranged in the same manner as the document is described.

However, in the document data 230, deleted areas may be packed and arranged.

With such a configuration, the number of pages of the document data 230 can be reduced by the amount corresponding to the reduction of advertisements, and the like.

In the above embodiment, the example in which the document reading unit 12 is an image scanner has been described.

However, the document reading unit 12 may include a camera instead of the image scanner or in addition to the image scanner. The camera in this case is an image capturing device including image sensor such as a CCD and a CMOS image sensor capable of capturing an image of the document D placed on the document feeding unit 13, an optical element such as a lens, and an LED illumination, and the like. In this case, the document reading unit 12 images the document D page by page. Specifically, the document reading unit 12 captures still images or moving images of the entire surface (page) of document Done by one, and outputs the acquired image data 200 to the storage unit 19. The camera may be provided with a mechanism such as a zoom and a tilt so as to be configured to capable of magnifying and imaging an arbitrary position of the document.

Further, the image capturing unit by using the camera may be configured to separately use a camera image capturing type scanner connected to the image forming apparatus 1. Alternatively, a device including the document reading unit 12, the document feeding unit 13, and the document reading unit 12 may be configured to connect to the printer. Further, the document reading unit 12 may be configured to use a camera of a user's mobile phone or smartphone, or the like.

With such a configuration, the above-described processing can be executed even in an image forming apparatus that does not include the document reading unit 12.

In addition, the configuration that image data 200 may be collectively transmitted to the image forming apparatus 1 in advance, and only necessary pages may be scanned by an image scanner such as the document reading unit 12, is possible.

Furthermore, each block 210 may include image data 200 captured by a camera and/or image data 200 of an image scanner. Then, the block 210 transmission unit may transmit the area data 220 derived from the image data 200 captured by the camera having a low resolution to the information processing apparatus 2 having a low processing capability.

On the other hand, the area data 220 derived from the image data 200 of the image scanner having a high resolution may be transmitted to the information processing apparatus 2 having a higher processing capability.

With such a configuration, the processing in each information processing apparatus 2 is averaged, the image processing process, or the like, is performed in the optimum information processing apparatus 2, and the document data 230 can be acquired in optimum speed.

Alternatively, the image reading apparatus of the present disclosure can be applied to information processing apparatuses other than the image forming apparatus 1. That is, the configuration may be such that a scan-only apparatus such as a document camera, a network scanner, the information processing apparatus 2 to which the scanner is separately connected by USB or the like, another server, or the like, is used.

Alternatively, the information processing apparatus 2 may not be used and only the image forming apparatus 1 may be used. In this case, with respect to one image forming apparatus 1, the remaining image forming apparatuses 1 can function in the same manner as the information processing apparatus 2 of the above-described embodiment.

Further, the configuration and operation of the above-described embodiment are examples, and it is needless to say that the configuration and operation can be appropriately changed and executed without departing from the aim of the present disclosure.

What is claimed is:

1. An image reading system including an image reading apparatus and an information processing apparatus, wherein:
the image reading apparatus includes:
a first controller,
a first non-transitory recording medium, and
a document reading unit configured to read a document in page units and output an image data,
a first control program is stored on the first non-transitory recording medium, wherein the first controller is configured to execute the first control program to operate as:
an area classification unit configured to classify the image data read by the document reading unit into area data for each content,
a blockchain creation unit configured to create a blockchain of the document by creating a block in which identification information is added to the area data classified by the area classification unit, and calculating and including a previous hash value of a previous block in order,
a block transmission unit configured to transmit the block created by the blockchain creation unit to the information processing apparatus,
a block acquisition unit configured to acquire the block processed by the information processing apparatus, and
a document output unit configured to collectively reconstruct the block acquired by the block acquisition unit into document data and output the document data;
the information processing apparatus includes a second controller and a second non-transitory recording medium;
a second control program is stored on the second non-transitory recording medium, wherein the second controller is configured to execute the second control program to operate as a block reception unit and a block retransmission unit:
the block reception unit is configured to receive the block from the image reading apparatus, the information processing apparatus includes an image processing unit configured to process or delete the area data for the block received by the block reception unit, and the block retransmission unit is configured to retransmit the block including the area data processed by the image processing unit to the image reading apparatus or another information processing apparatus.

2. The image reading system according to claim 1, wherein:

classification of the area includes a text, a table, and an image;

the block transmission unit transmits the block including the area data classified into the text or the table to the information processing apparatus capable of optical character recognition; and the image processing unit of the information processing apparatus processes the area data included in the block and outputs the area data including text data and/or table data.

3. The image reading system according to claim 2, wherein:

the block transmission unit transmits the block including the area data classified into the image to the information processing apparatus having high image processing performance.

4. The image reading system according to claim 2, wherein:

the image processing unit of the information processing apparatus recognizes an image not related to the content of the text and performs a deletion process.

5. The image reading system according to claim 4, wherein images not related to the content of the text include an advertisement, an illustration, and a logo.

6. An image forming system including an image forming apparatus and an information processing apparatus, wherein the image forming apparatus includes:
a first controller,
a first non-transitory recording medium, and
a document reading unit configured to read a document in page units and output an image data,
a first control program is stored on the first non-transitory recording medium, wherein the first controller is configured to execute the first control program to operate as:
an area classification unit configured to classify the image data read by the document reading unit into area data for each content,
a blockchain creation unit configured to create a blockchain of the document by creating a block in which identification information is added to the area data classified by the area classification unit, and calculating and including a previous hash value of a previous block in order,
a block transmission unit configured to transmit the block created by the blockchain creation unit to the information processing apparatus,
a block acquisition unit configured to acquire the block processed by the information processing apparatus, and
a document output unit configured to collectively reconstruct the block acquired by the block acquisition unit into document data and output the document data, the image forming apparatus includes an image forming unit configured to form an image of the document data output by the document output unit, the information processing apparatus includes a second controller and a second non-transitory recording medium, a second control program is stored on the second non-transitory recording medium, wherein the second controller is configured to execute the second control program to operate as a block reception unit and a block retransmission unit, the block reception unit is configured to receive the block from the image forming apparatus, the information processing apparatus includes an image processing unit configured to process or delete the area data for the block received by the block reception unit, and the block retransmission unit is configured to retransmit the block including the area data processed by the image processing unit to the image forming apparatus or another information processing apparatus.

7. The image forming system according to claim 6, wherein:

classification of the area includes a text, a table, and an image;

the block transmission unit transmits the block including the area data classified into the text or the table to the information processing apparatus capable of optical character recognition; and the image processing unit of the information processing apparatus processes the area data included in the block and outputs the area data including text data and/or table data.

8. The image forming system according to claim 7, wherein:

the block transmission unit transmits the block including the area data classified into the image to the information processing apparatus having high image processing performance.

9. The image forming system according to claim 7, wherein:

the image processing unit of the information processing apparatus recognizes an image not related to the content of the text and performs a deletion process.

10. The image forming system according to claim 9, wherein images not related to the content of the text include an advertisement, an illustration, and a logo.

11. An image reading method comprising the steps of:

causing an image reading apparatus to perform a step of reading a document page by page and outputting as image data;

causing the image reading apparatus to perform a step of classifying the image data into area data for each content;

causing the image reading apparatus to perform steps of creating a blockchain of the document by creating a block in which identification information is added to the classified area data, and calculating and including a pre-hash value of a previous block in order;

causing the image reading apparatus to perform a step of transmitting the created block to an information processing apparatus;

causing the information processing apparatus to perform a step of receiving the block from the image reading apparatus;

causing the information processing apparatus to perform a step of processing or deleting the area data of the received block;

causing the information processing apparatus to perform a step of retransmitting the block including the processed area data to the image reading apparatus or another information processing apparatus;

causing the image reading apparatus to perform a step of acquiring the block processed by the information processing apparatus; and causing the image reading apparatus to perform steps of collectively reconstructing the block that is acquired into document data and outputting the document data.

12. The image reading method according to claim 11, wherein:

classification of the area includes a text, a table, and an image;

in the image reading apparatus, the method further includes transmitting the block including the area data classified into the text or the table to the information processing apparatus capable of optical character recognition; and in the information processing apparatus, the method further includes processing the area data included in the block and outputting the area data including text data and/or table data.

13. The image reading method according to claim 12, further comprising:

in the image reading apparatus, transmitting the block including the area data classified into the image to the information processing apparatus having high image processing performance.

14. The image reading method according to claim 12, further comprising:

in the information processing apparatus, recognizing an image not related to the content of the text and performs a deletion process.

15. The image reading method according to claim 14, wherein images not related to the content of the text include an advertisement, an illustration, and a logo.

* * * * *